(12) United States Patent
Lindsay et al.

(10) Patent No.: US 7,412,663 B2
(45) Date of Patent: Aug. 12, 2008

(54) DYNAMIC REFLECTIVE HIGHLIGHTING OF A GLASS APPEARANCE WINDOW FRAME

(75) Inventors: Donald J. Lindsay, Mountain View, CA (US); Greg S. Melander, Redmond, WA (US); Tjeerd Hoek, Kirkland, WA (US)

(73) Assignee: Microsoft Corporation, Redmond, CA (US)

( * ) Notice: Subject to any disclaimer, the term of this patent is extended or adjusted under 35 U.S.C. 154(b) by 273 days.

(21) Appl. No.: 11/289,510

(22) Filed: Nov. 30, 2005

(65) Prior Publication Data
US 2007/0124691 A1    May 31, 2007

(51) Int. Cl.
*G06F 3/00* (2006.01)
(52) U.S. Cl. .................. 715/781; 715/765; 715/768; 715/782
(58) Field of Classification Search ................. 715/765, 715/764, 767, 768, 778, 781, 803, 782
See application file for complete search history.

(56) References Cited

U.S. PATENT DOCUMENTS

| | | | |
|---|---|---|---|
| 5,452,406 A * | 9/1995 | Butler et al. ................. | 345/426 |
| 5,499,323 A | 3/1996 | Doi et al. | |
| 5,639,151 A | 6/1997 | McNelley et al. | |
| 5,742,292 A | 4/1998 | Murata | |
| 5,742,749 A * | 4/1998 | Foran et al. ................. | 345/426 |
| 5,917,487 A * | 6/1999 | Ulrich ........................ | 715/765 |
| 6,034,691 A | 3/2000 | Aono et al. | |
| 6,445,400 B1 * | 9/2002 | Maddalozzo et al. ........ | 715/803 |
| 6,452,593 B1 | 9/2002 | Challener | |
| 6,728,420 B2 | 4/2004 | Tsunashima et al. | |
| 6,903,741 B2 | 6/2005 | Corbetta | |
| 2003/0058278 A1 * | 3/2003 | Allen et al. ................. | 345/765 |
| 2004/0015858 A1 | 1/2004 | Setp et al. | |
| 2005/0060658 A1 * | 3/2005 | Tsukiori ..................... | 715/765 |
| 2005/0091608 A1 * | 4/2005 | Gusmorino ................. | 715/801 |
| 2005/0099418 A1 | 5/2005 | Cabral et al. | |

OTHER PUBLICATIONS

Boivin, Samuel and Gagalowicz, André, "Image-Based Rendering of Diffuse, Specular and Glossy Surfaces from a Single Image," Aug. 17, 2001, pp. 107-116.

(Continued)

*Primary Examiner*—Sy D. Luu
*Assistant Examiner*—Anil N Kumar
(74) *Attorney, Agent, or Firm*—Shook, Hardy & Bacon, LLP

(57) ABSTRACT

Aspects for changing a reflective highlight on a glass appearance window frame of an application window are described. An illustrative method includes steps of displaying a first reflective highlight on a glass appearance window frame of an application window, calculating a second reflective highlight in response to detection of an event, and changing the displayed first reflective highlight on the glass appearance window frame of the first application window to the second reflective highlight. The event may correspond to a command to move and/or resize the application window, determination of a time of day event, determination of a change in active/inactive status of the application window, or to a command to change a reflective highlight configuration. Reflective highlights may be changed automatically and/or in response to receipt of an input from a user to change one or more portions of a reflective highlight configuration.

19 Claims, 18 Drawing Sheets

OTHER PUBLICATIONS

"Interactive Transparency Rendering for Large CAD Models," printed from http://portal.acm.org/citation/cfm?id=1079840.1080032 (printed on Sep. 16, 2005) 2 pages.

Diefenbach, Paul J. and Badler, Norman I., "Multi-Pass Pipeline Rendering: Realism For Dynamic Environments," 1997, pp. 59-70.

Debevec, Paul, "Rendering Synthetic Objects into Real Scenes: Bridging Traditional and Image-based Graphics with Global Illumination and High Dynamic Range Photography," 1998, pp. 1-10.

Kinker, Gudrun J., Shafer, Steven A., and Kanade, Takeo, "Using A Color Reflection Model To Separate Highlights From Object Color," pp. 1-10.

* cited by examiner

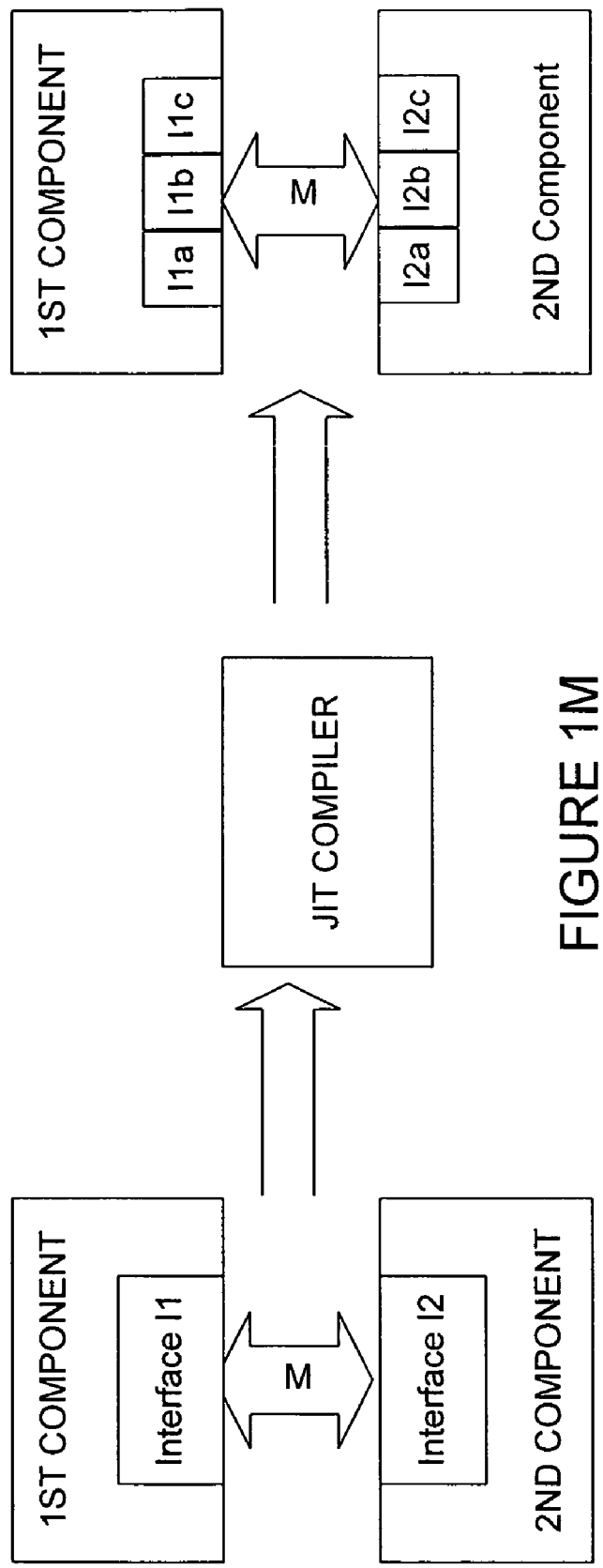

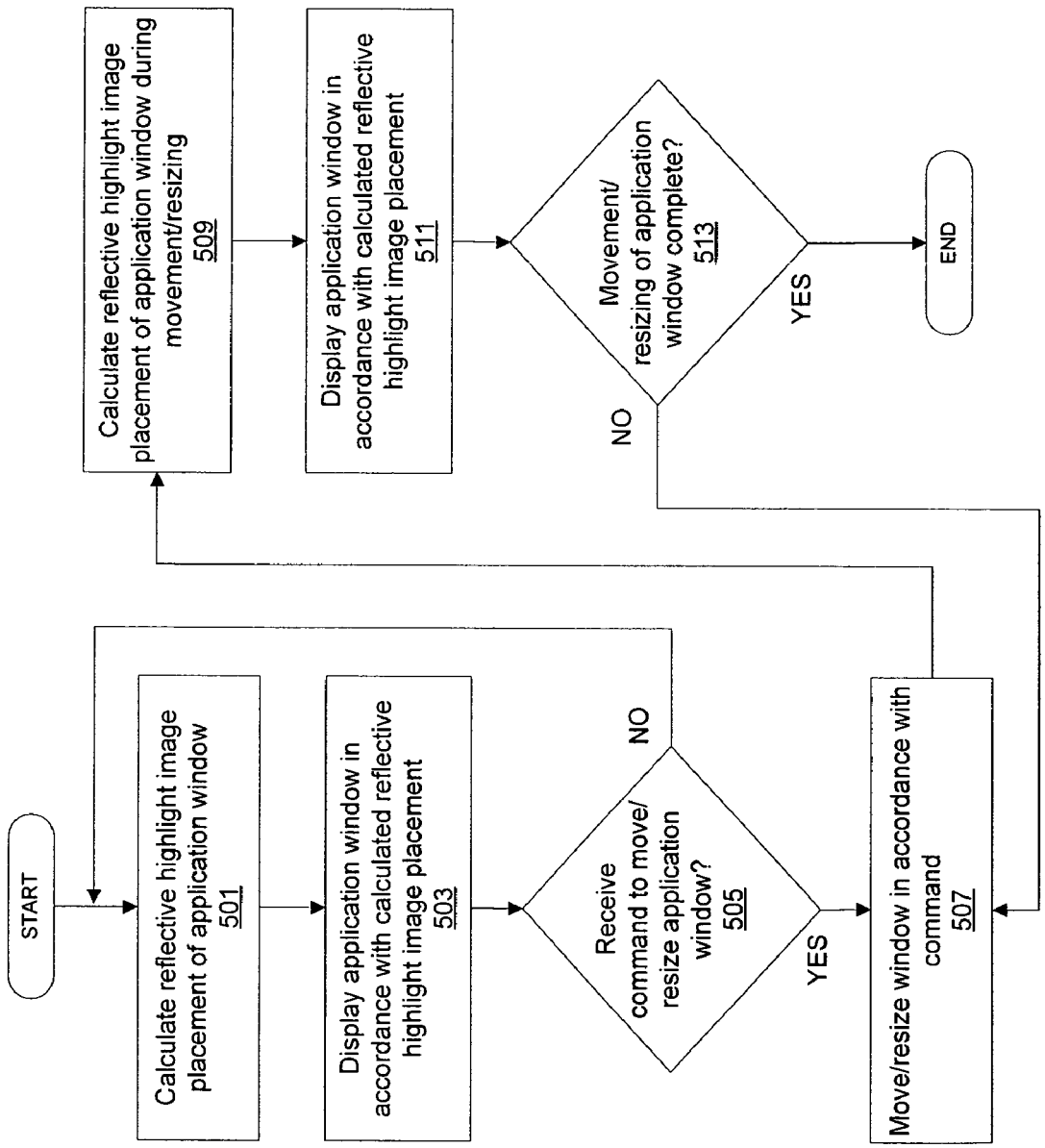

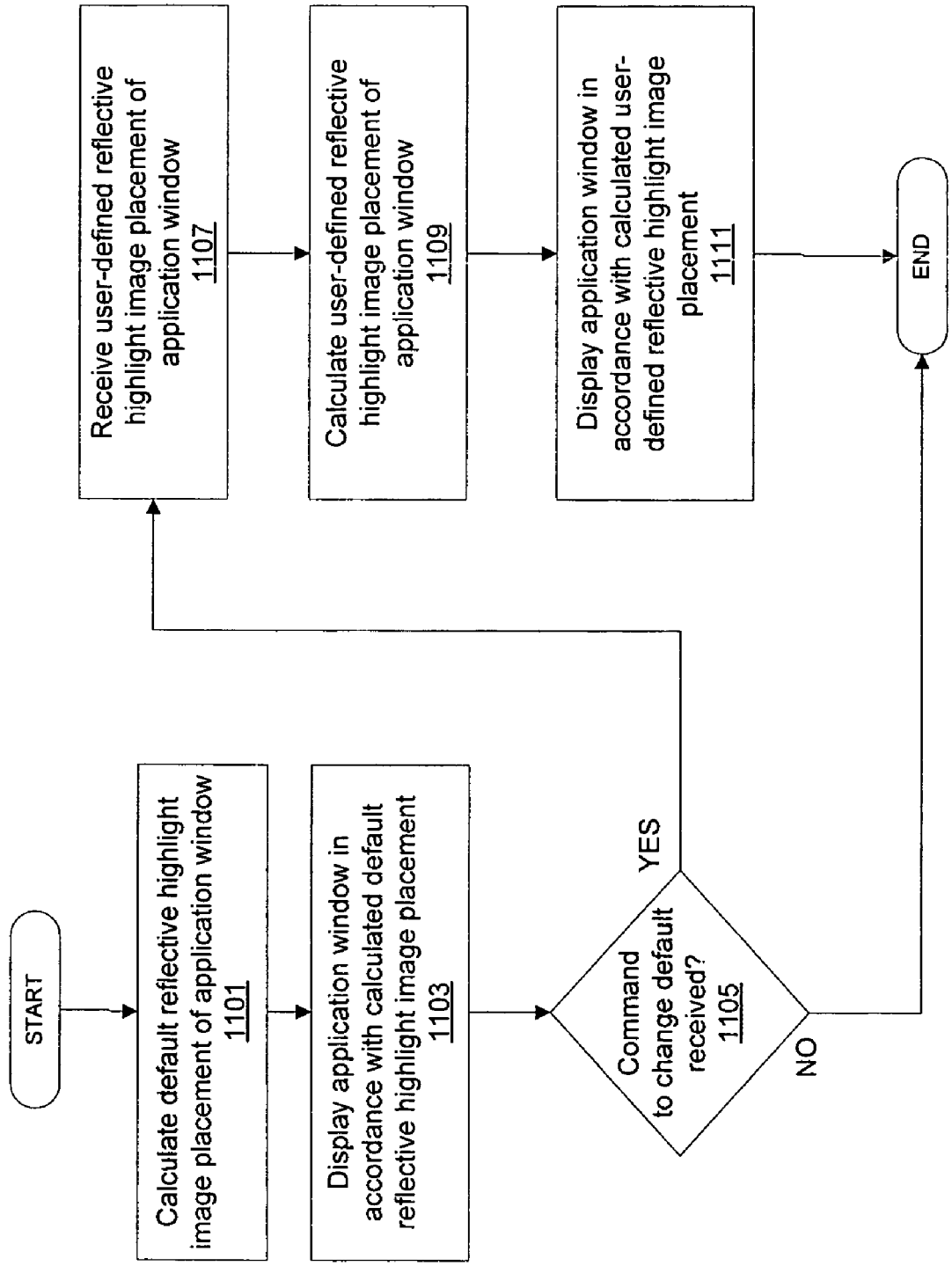

DYNAMIC REFLECTIVE HIGHLIGHTING OF A GLASS APPEARANCE WINDOW FRAME

BACKGROUND

Over the last two decades, the number of users of computers has constantly increased. Beyond the staple of use of computers in the work environment, the use of computers at home and in personal settings has also increased during this same time. As this use of computers in both the workforce and personal life has increased, so has the desire to allow for easier use of them. In order to make the process easier for users, many operating systems today utilize a windows based configuration of application programs.

Application windows are a user interface facility of graphical user interface (GUI) systems. While application windows may vary in appearance across systems, they share many common attributes, such as a frame area with a title bar control containing window management controls, the ability to be resized and repositioned, and the ability to exist among other application windows associated with different applications. Together, multiple application windows can appear simultaneously on the screen, even layered on top of each other, typically represented by the order each application window was last accessed by the user. When an application window is the window that a user is working with currently, its frame appears in an active visual state. This is in contrast to an inactive visual state when the application window is not the window the user is currently working with. These two states typically have different appearances and primarily serve to communicate to the user which application window she is currently working with.

SUMMARY

Increasing a user experience in an operating environment and additional manners for identification of application windows, property sheets, and dialogs for the user are always under development. Creating real world environments during a user experience facilitates an easier understanding of use of an application window and other user interface elements displayed as part of an operating system. Aspects of the invention include a system for rendering dynamic reflective highlighting to a glass appearance window frame. Other aspects are directed to methods for reflective highlight image placement that is calculated in real time to change the glass appearance window frame's visual appearance over time and/or in the event of an action.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIGS. 1B through 1M show a general-purpose computer environment supporting one or more aspects of the present invention;

FIG. 5 is a flowchart of an illustrative example of a method for displaying an application window with a glass appearance window frame in accordance with at least one aspect of the present invention;

FIG. 11 is a flowchart of an illustrative example of a method for changing a default reflective highlight of a window frame of an application window in accordance with at least one aspect of the present invention.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1A:
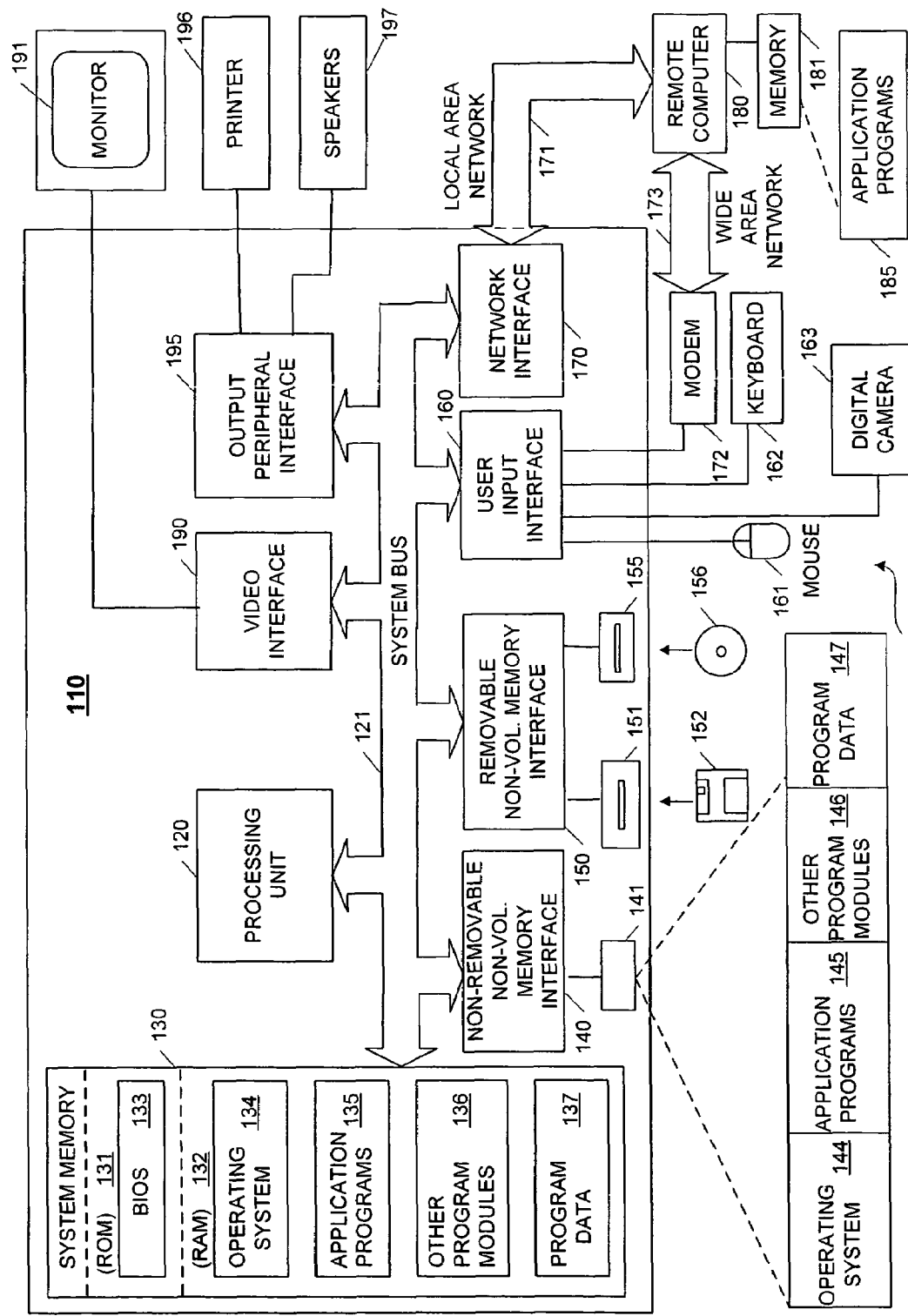
FIG. 1A illustrates a schematic diagram of a general-purpose digital computing environment in which certain aspects of the present invention may be implemented.

FIG. 1A illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1A, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
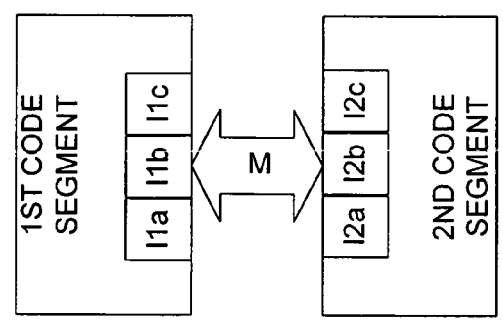
Figure 1E:
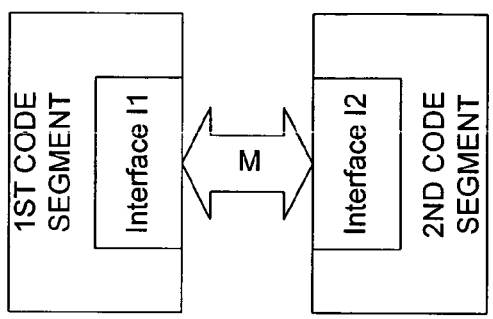
Figure 1B:
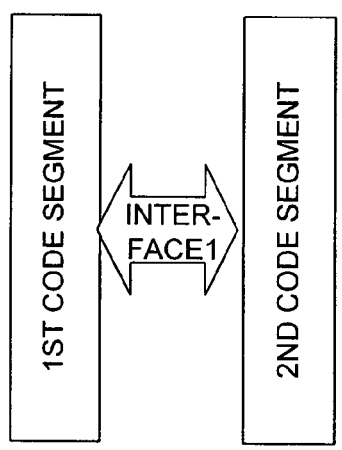

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
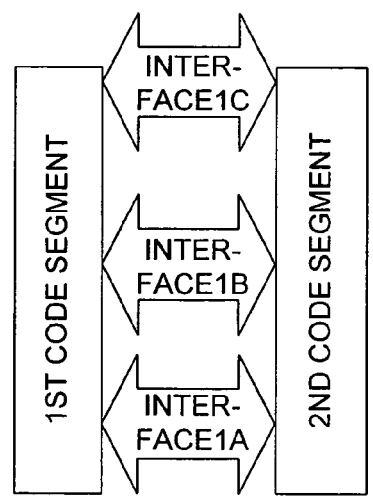

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
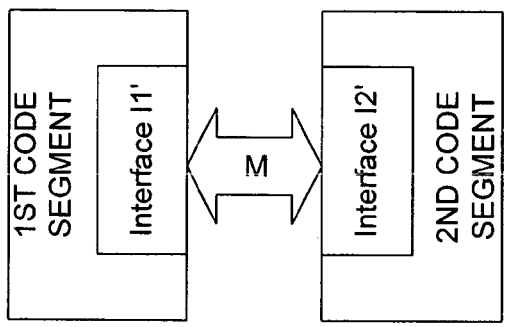
Figure 1G:
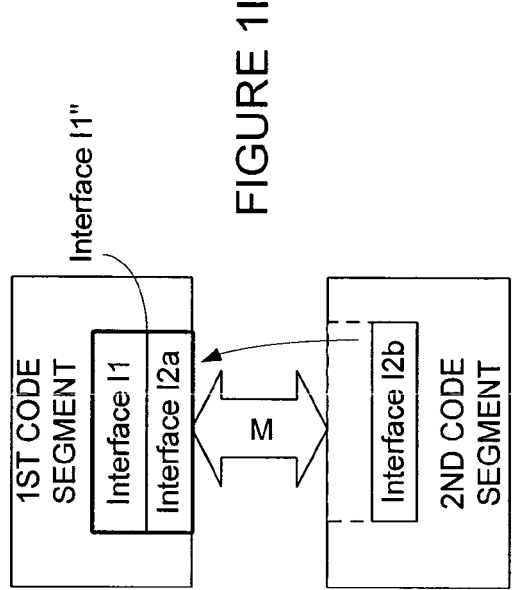

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
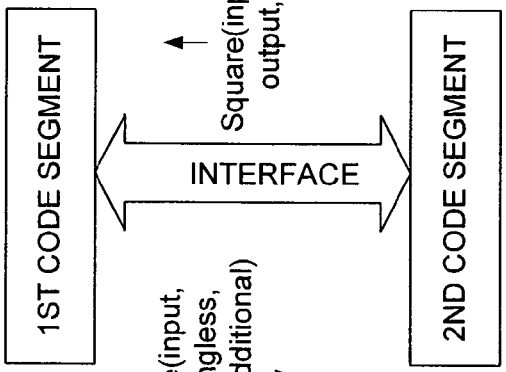
Figure 1I:
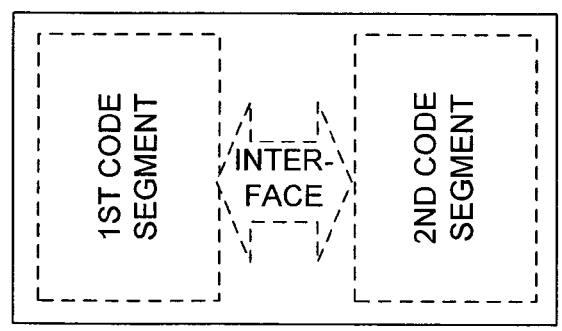

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into 12a and 12b, and interface portion 12a has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
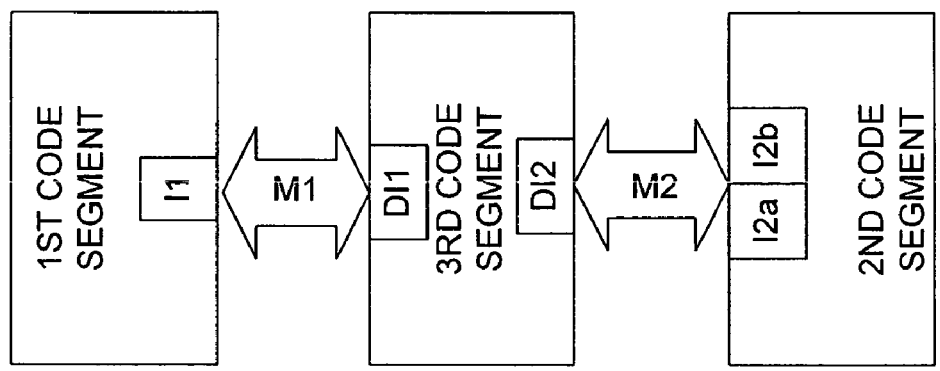
Figure 1J:
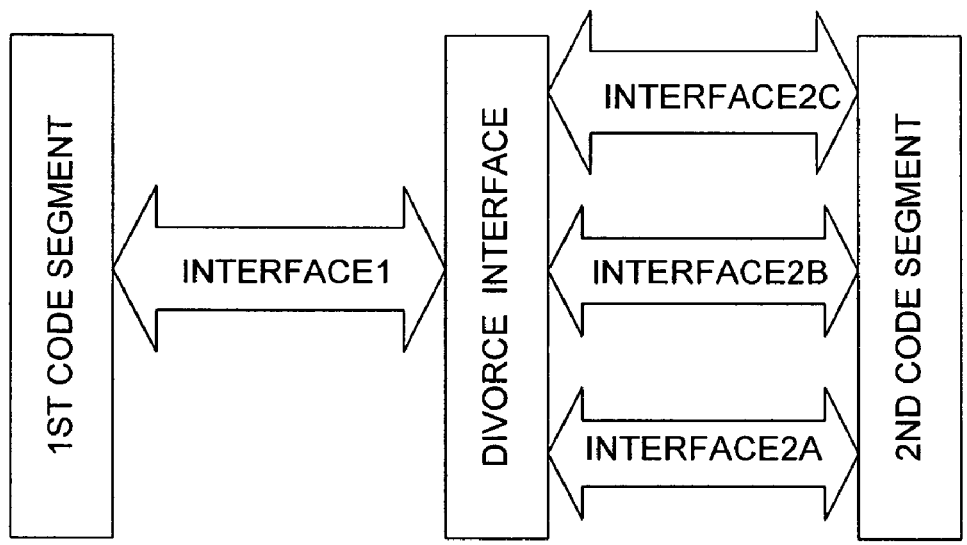

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
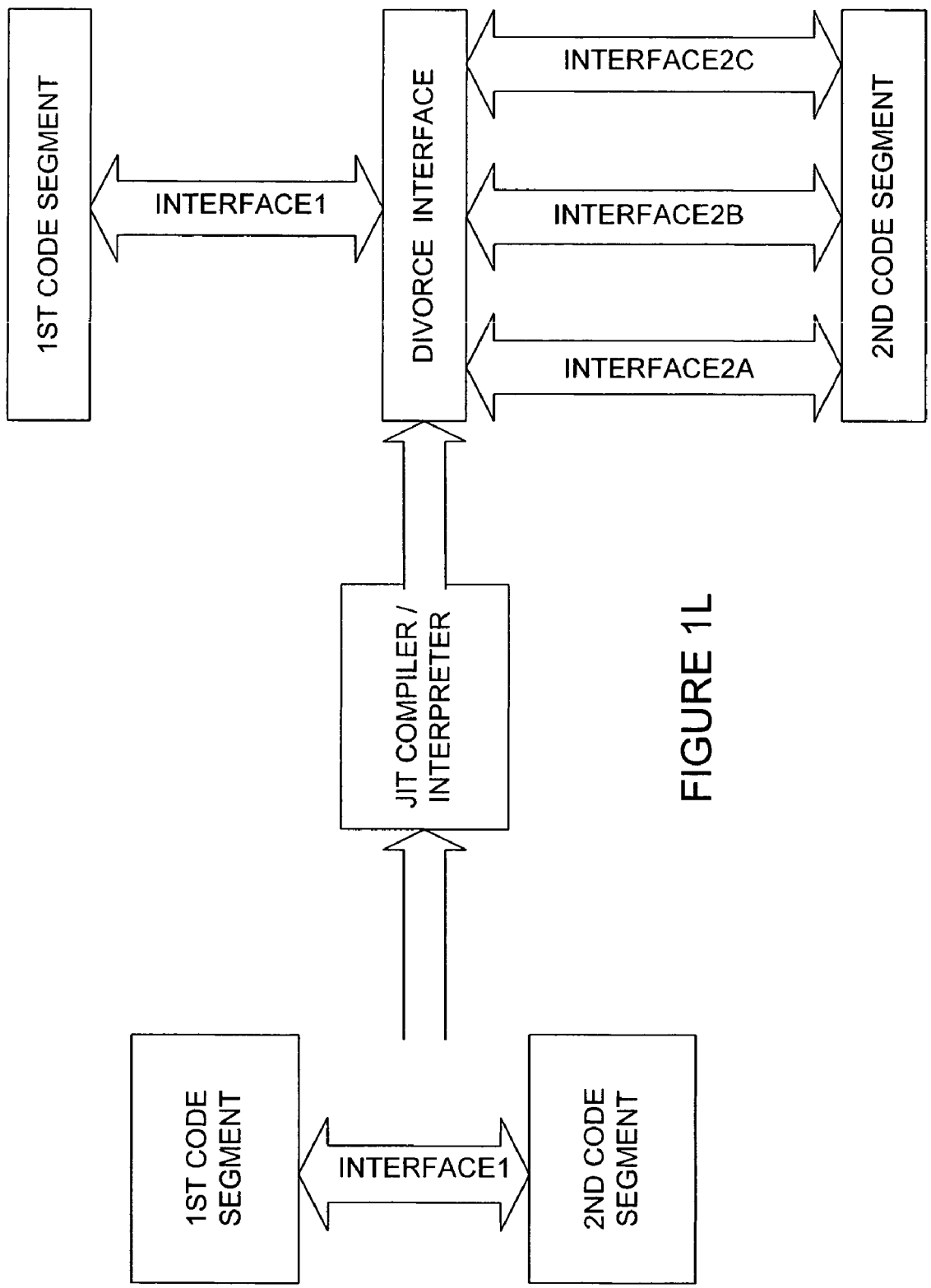

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

In Windows Vista™ by Microsoft® Corporation of Redmond, Wash., a user experience may be a glass appearance window frame common to all application windows, property sheets and dialogs. The properties of this glass appearance window frame may include a partially transparent frame appearance. Additionally, any visible region behind the glass appearance may be blurred. When combined, these individual elements may capture and convey some of the visual attributes associated with a real world, physical pane of glass.

One additional element to capturing and conveying the properties of a real world, physical pane of glass is the visual and behavioral attributes of a dynamic reflective highlight. Also referred to as a reflection highlight or environment highlight, a dynamic reflective highlight is a visual treatment that describes a stationary light source or reflection applied to a potentially non-stationary and reflective object. If the object is moved, the reflection highlight may remain stationary and either not move with the object, or move at a different speed or direction from the object. In order to provide more user interface elements to enhance a user's experience, such visual and behavioral attributes of a dynamic reflective highlight are needed.

Figure 2:
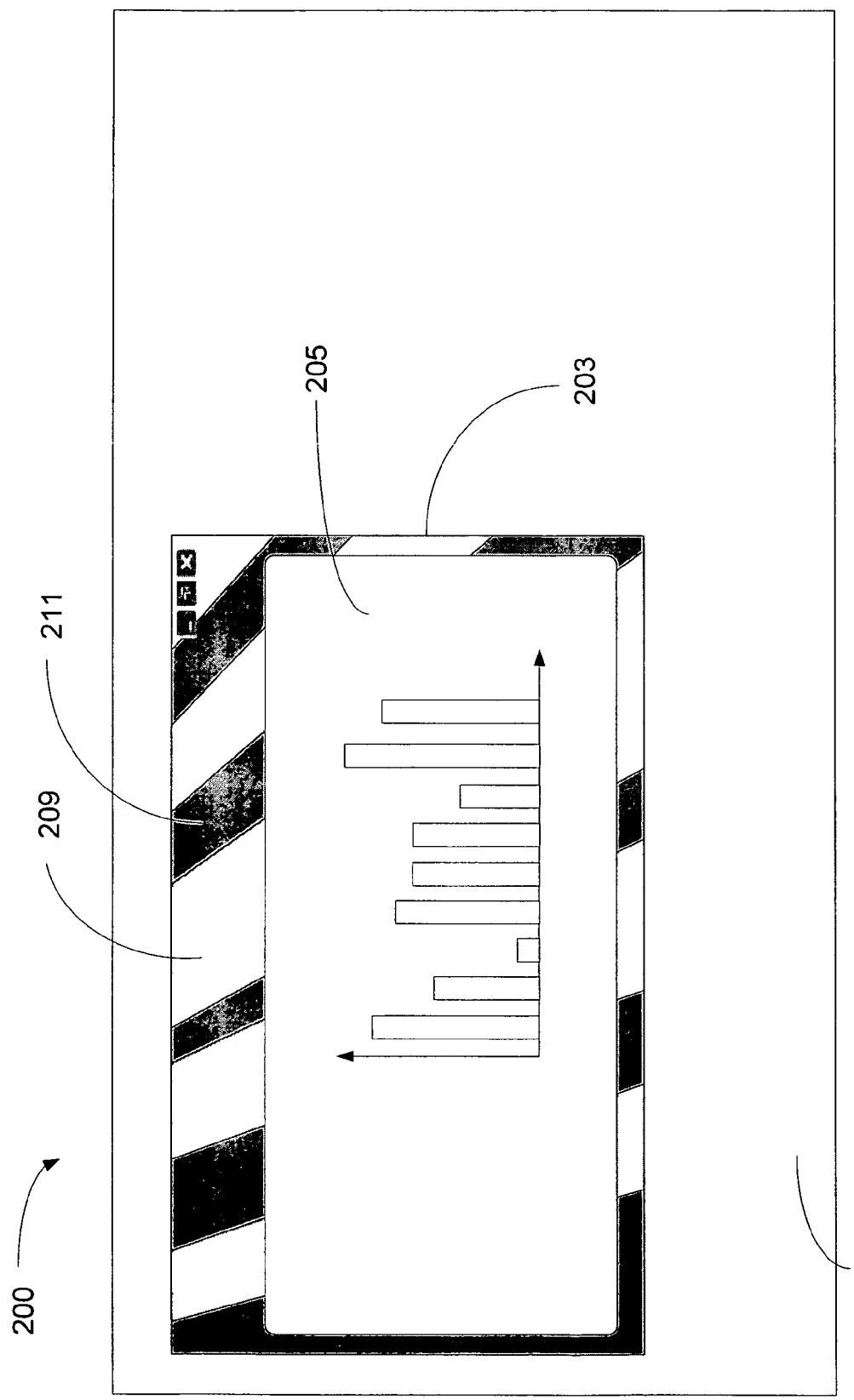
FIG. 2 illustrates an example of an application window scenario including a reflective highlight in a first state in accordance with at least one aspect of the present invention.

FIG. 2 illustrates an example of an application window scenario including a reflective highlight in a first state 200 in accordance with at least one aspect of the present invention. As shown, application window 203 is shown within a desktop space 201. As described herein, the Figures illustrate examples of the present invention with respect to application windows. Although not shown in the Figures, it should be understood by those skilled in the art that user interface elements utilizing a window frame may include one or more aspects of the present invention. For example, aspects of the present invention may be used for property sheets and dialog boxes that utilize a glass appearance window frame. Representation of these visual appearances would be readily apparent to those skilled in the art.

As shown in FIG. 2, desktop space 201 is an area or region of a display that allows for the display of application windows corresponding to application programs. Application window 203 is used by an application program to display content 205 to a user. Application window 203 is shown to include a glass appearance window frame. The glass appearance window frame of application window 203 may be configured to only be shown around the top of the application window 203 and/or one or more other sides of the application window 203.

The glass appearance window frame of application window 203 is shown being represented by a number of reflective highlight regions 209 and non-reflective highlight regions 211. In a user experience and the rendering of the glass appearance window frame, a visual and behavioral element that effectively mimics dynamic reflection highlights is introduced. The configuration of reflective highlight portions 209 and non-reflective highlight portions 211 are dynamic in that they can change over time or in response to some event. The reflective highlight regions 209 may be slightly more opaque, e.g., whitish regions, in the glass appearance window frame, compared to the non-reflective highlight portions 211, which suggest a highlight reflected by glass. Together, the transparency, underlying blur, and the reflective highlight suggest the properties associated with real-world glass.

The reflective highlight portions 209 and non-reflective highlight portions 211 may be part of the composition of common glass appearance window frames and may be a combination of a pre-defined bitmap image and a programmatically-described position and masking on top of the glass appearance window frame as described below. The configuration of the reflective highlight portions 209 and non-reflective highlight portions 211 illustrates a first state of the glass appearance window frame. In accordance with at least one aspect of the present invention, the reflective highlight portions 209 and non-reflective highlight portions 211 change dynamically.

It should be understood that the pattern of reflective highlight portions 209 and non-reflective highlight portions 211 is merely illustrative of one configuration of a reflective highlight of a glass appearance window frame for an application window 203. As described below, the point of reference for the light source creating the reflective highlights may be changed, thus creating a difference appearance for the reflective highlight and non-reflective highlight portions.

Figure 3:
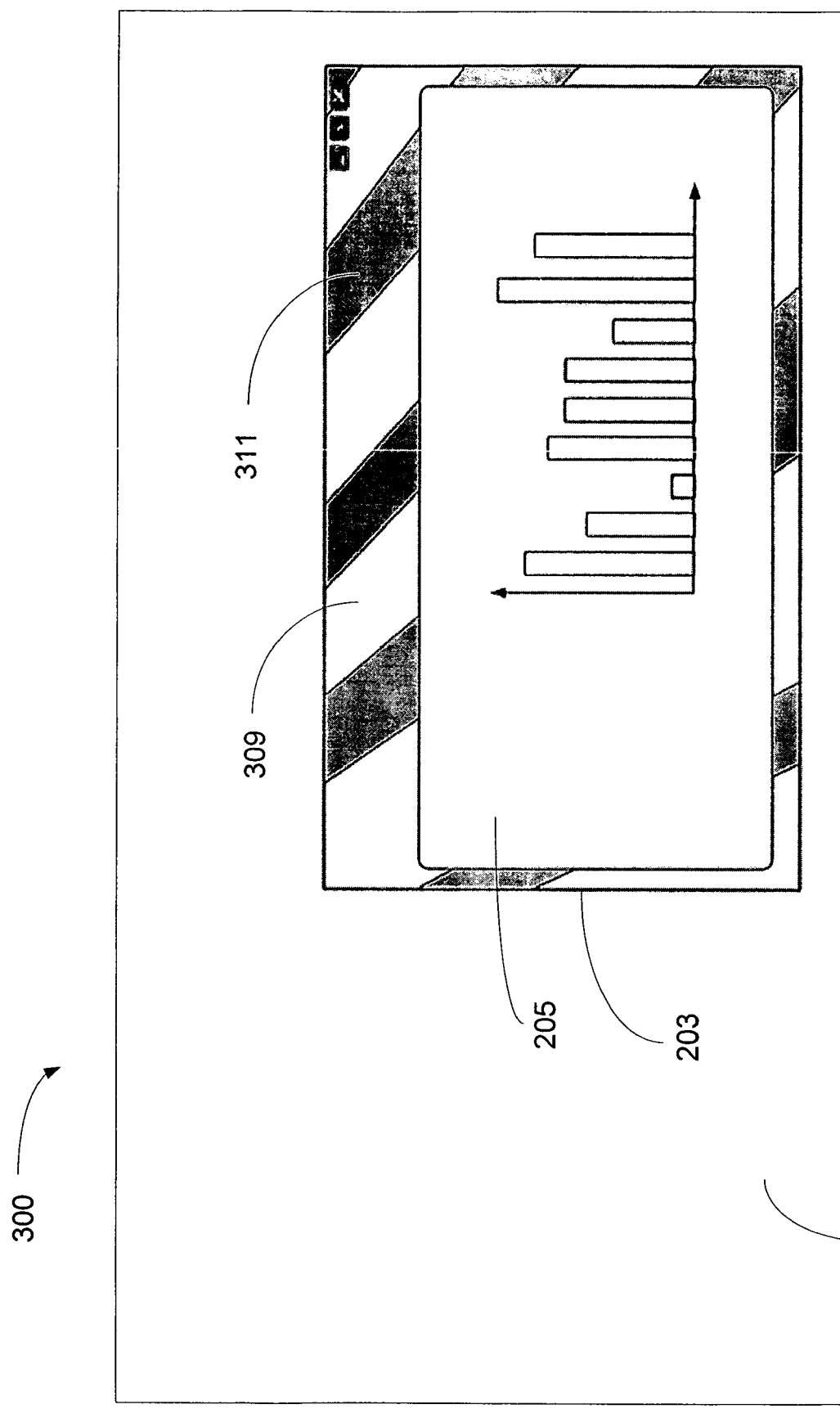
FIG. 3 illustrates an example of the application window scenario of FIG. 2 including a reflective highlight in a second state in accordance with at least one aspect of the present invention.

FIG. 3 illustrates an example of the application window scenario of FIG. 2 including a reflective highlight in a second state 300 in accordance with at least one aspect of the present invention. FIG. 3 occurs when a command has been received to move the position of the application window 203 within the desktop space 201. Such a command may occur when an operating system receives an input from a user to change the position of the application window 203. A user may click and drag the application window 203 within the desktop space 201 to change the position. While in motion and at the final resting place of the application window 203, the reflective highlight of the glass appearance window frame changes dynamically.

FIG. 3 illustrates when application window 203 has been moved from its relative position within the desktop space 201 as seen in FIG. 2 to a new position. As shown in FIG. 3, reflective highlight portions 309 and non-reflective highlight portions 311 are located within different positions of the glass appearance window frame relative to reflective highlight portions 209 and non-reflective highlight portions 211 illustrated in FIG. 2.

The reflective highlight portions 209 and 309 and non-reflective highlight portions 211 and 311 may be calculated in real time for each refresh frame of a display screen. In addition, and in accordance with at least one aspect of the present invention, the portions 209, 309, 211, and 311 are calculated and displayed during an application window 203 move and/or resize operation. The portions change during a move and/or resize operation based on a set of rules that describe a reflective highlight image's placement relative to the current position of the application window 203 within desktop space 201. The result is that the reflective highlight portions move independently from the movement of the application window 203 glass appearance frame. Such a configuration creates the impression of a reflection highlight.

It should be understood by those skilled in the art that the number of application windows shown is merely illustrative and that any number of application windows may be open at a time including those presented on the desktop space 201.

Figure 4:
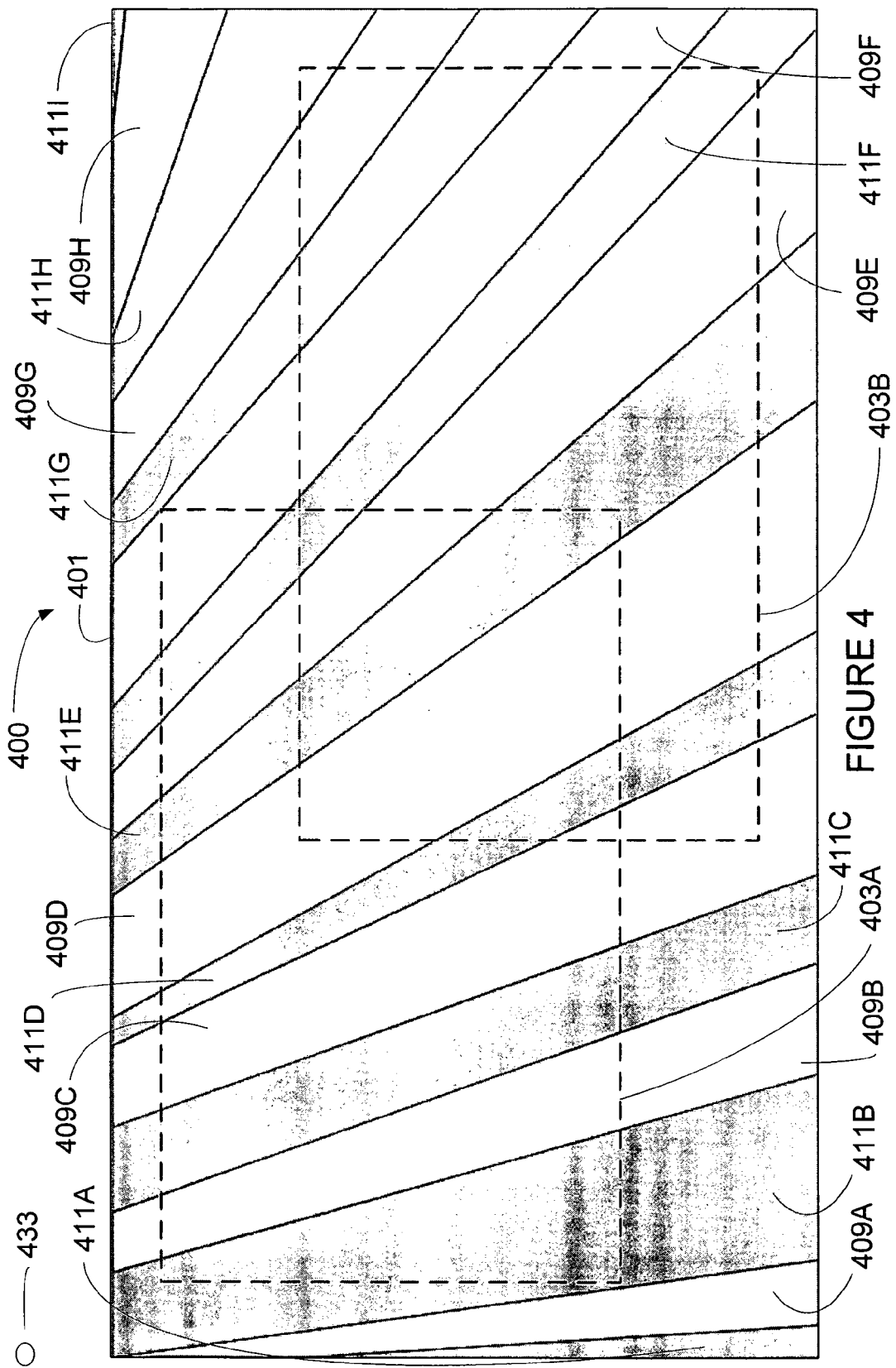
FIG. 4 illustrates an example of a reflective highlight image bitmap for use in rendering a glass appearance window frame in accordance with at least one aspect of the present invention.

FIG. 4 illustrates an example 400 of a reflective highlight image bitmap 401 for use in rendering a glass appearance window frame in accordance with at least one aspect of the present invention. As described above, a reflective highlight of a glass appearance of an application window frame changes during a move and/or resize operation based on a set of rules that describe a reflective highlight image's placement relative to the current position of the application window within a desktop space. FIG. 4 shows a reflective highlight image bitmap 401 that includes a number of reflective highlight portions 409A-409H and a number of non-reflective highlight portions 411A-411I.

The configuration of the reflective highlight portions 409 and the non-reflective highlight portions 411 may be based upon a reference point 433 of a light source. Reference point 433 is not a physical point, but merely a reference location for generation of reflection highlight image bitmap 401. It should be understood by those skilled in the art that reference point 433 may be positioned to change the configuration of the portions 409 and 411. The configuration of the portions 409 and 411 may be part of an operating system theme and/or may be user-configurable. For example, a default configuration of the highlight reflection image bitmap 401 may be changed by a user changing the relative location of the reference point 433. By extending the relative distance between the reference point 433 of a light source and the image bitmap 401, the configuration of the portions 409 and 411 changes. For example, the angle of the slants differentiating the reflective highlight portions 409A-409H and the non-reflective highlight portions 411A-411I may change in response to a change in the relative distance of the between the reference point 433 of a light source and the image bitmap 401.

Reflective highlight image bitmap may be an 800×700 pixel bitmap that creates the highlight itself, e.g., the diagonal stripes in FIG. 4. It should be understood by those skilled in the art that a variety of display screen dimensions may be utilized by stretching the image bitmap 401 to fill the screen dimensions, e.g., for a 1024×768 pixel region.

The application window position within a desktop determines what region of the reflective highlight image bitmap 401 is revealed. For example, as shown in FIG. 4, the location of application window 203 from FIG. 2 is shown by the dashed line region 403A. This region 403A is utilized in rendering the appearance of the glass appearance window frame of the application window 203 in FIG. 2. The reflective highlight image bitmap 401 is another layer in development of the overall appearance of the application window 203 and its corresponding glass appearance window frame. Also as shown in FIG. 4, the location of application window 203 from FIG. 3 is shown by the dashed line region 403B. This region 403B is utilized in rendering the appearance of the glass appearance window frame of the application window 203 in FIG. 3.

Therefore, as the application window 203 is moved from its location within a desktop space 201 in FIG. 2 to its location in FIG. 3, different regions of the reflective highlight image bitmap 401 are utilized for rendering of the application window 203 during the movement. This visual feature is then further enhanced by using the application window offset from the center of the desktop space 201 to calculate the offset of the reflection highlight. The reflective highlight may move across the application window at a different rate than the application window. Such is the dynamic behavior of the reflection highlight. Although not described in the Figures, it should be understood by those skilled in the art that the same manner for dynamically changing the reflective highlight may occur during a resizing of an application window 203 as well and that the present invention is not so limited to the examples described herein.

The properties of this glass appearance application window frame 203 may include a partially transparent frame appearance and reflection highlights. Additionally, any visible region behind the glass appearance frame in the desktop space 201 may be blurred. When combined, these individual elements capture and convey the visual attributes associated with a real world, physical pane of glass including a dynamic reflective highlight.

FIG. 5 a flowchart of an illustrative example of a method for displaying an application window with a glass appearance window frame in accordance with at least one aspect of the present invention. Aspects of the present invention include a method for displaying a dynamic reflection highlight as applied to an application window that includes an image bitmap of the reflective highlight and a set of rules for the programmatically-calculated placement of the image bitmap, opacity and masking of the reflective highlight at both idle time and during user interface operations on the application window such as a user- or system-controlled move or transformation, e.g., resizing the application window is described. The process starts and at step 501 a reflective highlight image placement of an application window is calculated. At step 503, the application window is displayed in accordance with the calculated reflective highlight image placement. For example, application window 203 in FIG. 2 may be the result from step 503.

Proceeding to step 505, a determination is made as to whether a command is received to move and/or resize the application window. If no, the process returns to step 501 for a refresh of the display screen in which the application window is displayed. If yes to step 505, the method moves to step 507 where the application window is moved and/or resized in accordance with the command. For example, the command may be a user click and drag of the application window 203 from its first location shown in FIG. 2 to its end location shown in FIG. 3. At step 509, a reflective highlight image placement of the application window is calculated during the movement and/or resizing operation. Similarly, at step 511, the application window is displayed in accordance with the calculated reflective highlight image placement. At step 513, a determination is made as to whether the movement and/or resize operation on the application window is complete. If so, the process ends, if not, the process returns to step 507. In accordance with one or more steps of the method of FIG. 5, the reflective highlight on an application window dynamically changes for each frame of the refresh of a display screen that displays the application window to a user.

Figure 6A:
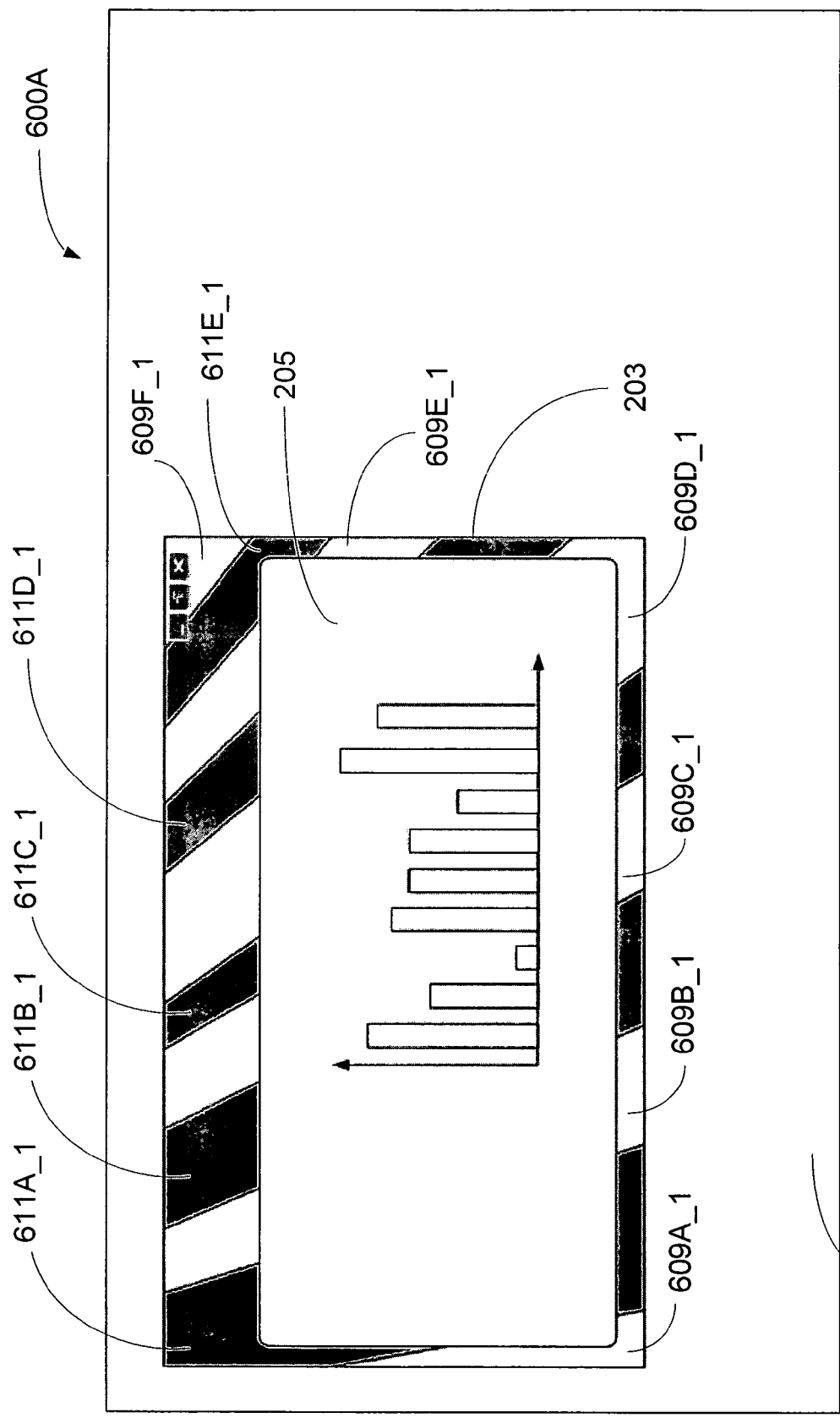
FIGS. 6A-6B illustrates an example of an application window scenario including a reflective highlight in first and second states respectively in accordance with at least one aspect of the present invention.
Figure 6B:
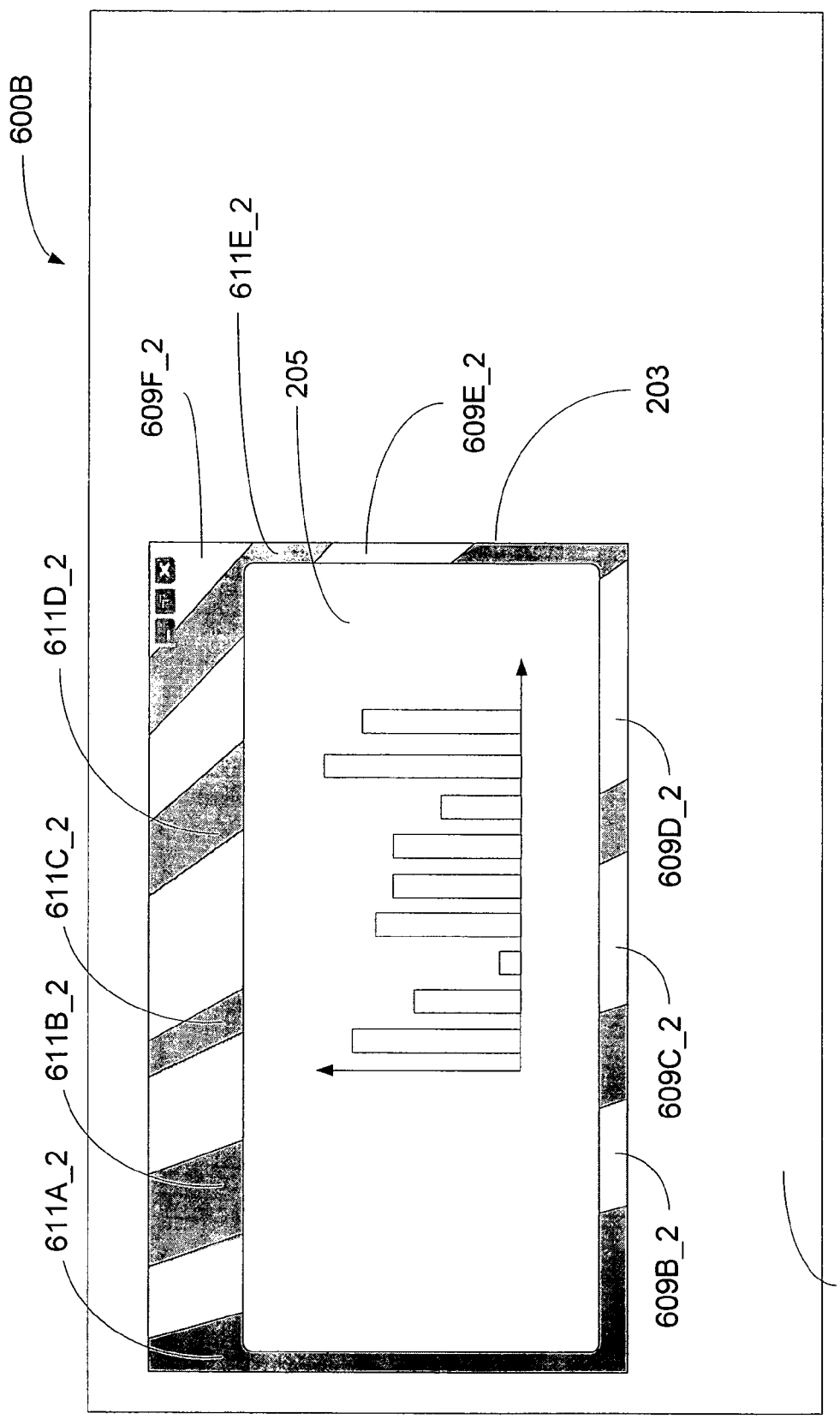

FIGS. 6A-6B illustrates an example of an application window scenario including a reflective highlight in first state 600A and second state 600B respectively in accordance with at least one aspect of the present invention. FIGS. 6A and 6B illustrate an example of a time of day related change to a reflective highlight of an application window. FIG. 6A shows the first state 600A of an application window 203 within a region of a desktop space 201. Application window 203 is shown to include a number of reflective highlight portions 609A_1 to 609F_1 and a number of non-reflective highlight portions 611A_1 to 611E_1. Once again, it should be understood by those skilled in the art that the configuration of the reflective highlights in the Figures is merely illustrative and that other configurations may also be utilized in accordance with one or more aspects of the present invention.

FIG. 6B shows the second state 600B of the application window 203 within the same region of the desktop space 201. As shown, the glass appearance frame of application window 203 includes a number of reflective highlight portions 609B_2 to 609F_2 and a number of non-reflective highlight portions 611A_2 to 611E_2. From FIG. 6A to FIG. 6B, reflective highlight portion 609A disappears as that particular pattern of reflective highlight is no longer exposed. The pattern of reflective highlight portions 609 and non-reflective highlight portions 611 has shifted from the first state 600A shown in FIG. 6A to the second state 600B shown in FIG. 6B. Such a change in the reflective highlight may be configured to occur as a result of an occurrence of a time of day event, such as a change of time of day. For example, the first state shown in FIG. 6A may be a state that an operating system renders for an application window of that size in that particular region of the desktop space between the hours of 6 AM and 7 AM. Then, from the hours of 7 AM to 8 AM, the second state shown in FIG. 6B may be a state that the operating system renders for an application window of that size in that particular region of the desktop space. As such, as a time of day event occurs, the reflective highlight changes accordingly.

Figure 7:
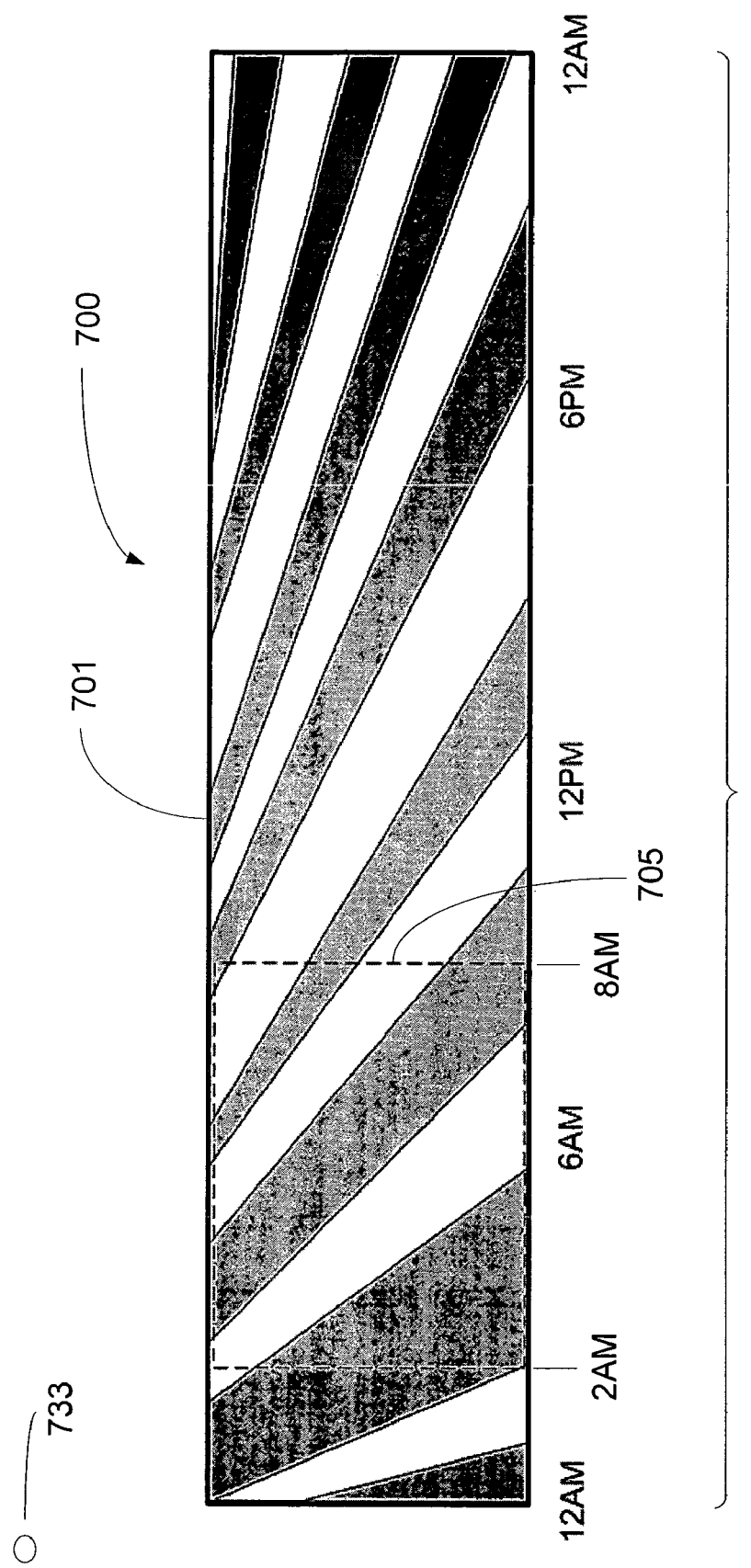
FIG. 7 illustrates an example of a reflective highlight image bitmap for use in rendering a glass appearance window frame over time in accordance with at least one aspect of the present invention.

FIG. 7 illustrates an example 700 of a reflective highlight image bitmap for use in rendering a glass appearance window frame over time in accordance with at least one aspect of the present invention. As described above, a reflective highlight of a glass appearance of an application window frame may be configured to change during a move and/or resize operation based on a set of rules that describe a reflective highlight image's placement relative to the current position of the application window within a desktop space. Concurrently or alternatively, a reflective highlight may be configured to change in response to a time of day event. FIG. 7 shows a reflective highlight image bitmap 701 that includes a number of reflective highlight portions and a number of non-reflective highlight portions.

The configuration of the reflective highlight portions and the non-reflective highlight portions may be based upon a reference point 733 of a light source. As described above, reference point 733 is not a physical point, but merely a reference location for generation of reflection highlight image bitmap 701. It should be understood by those skilled in the art that reference point 633 may be positioned to change the configuration of the portions.

As shown in FIG. 7, a 24-hour time scale 707 is shown and a window 705 is shown in dashed lines. Window 705 is associated with the desktop space 201 and represents the reflective highlight image bitmap 701 portion that changes over time. Window 705 is shown to be the portion of the reflective highlight image bitmap 701 utilized by an operating system in rendering a glass appearance window frame of an application window between the hours of 2 AM and 8 AM. Again, it should be understood by those skilled in the art that the configuration of the reflective highlight image bitmap 701 may be different and/or the configuration of the time scale 707 and/or portions shown of the image bitmap 701 may be different. The present invention is not so limited to the examples provided herein. For example, although shown in a horizontal and linear manner, the window 705 may be configured to move around a circular type image bitmap, a non-linear image bitmap, and/or some other configuration.

Figure 8:
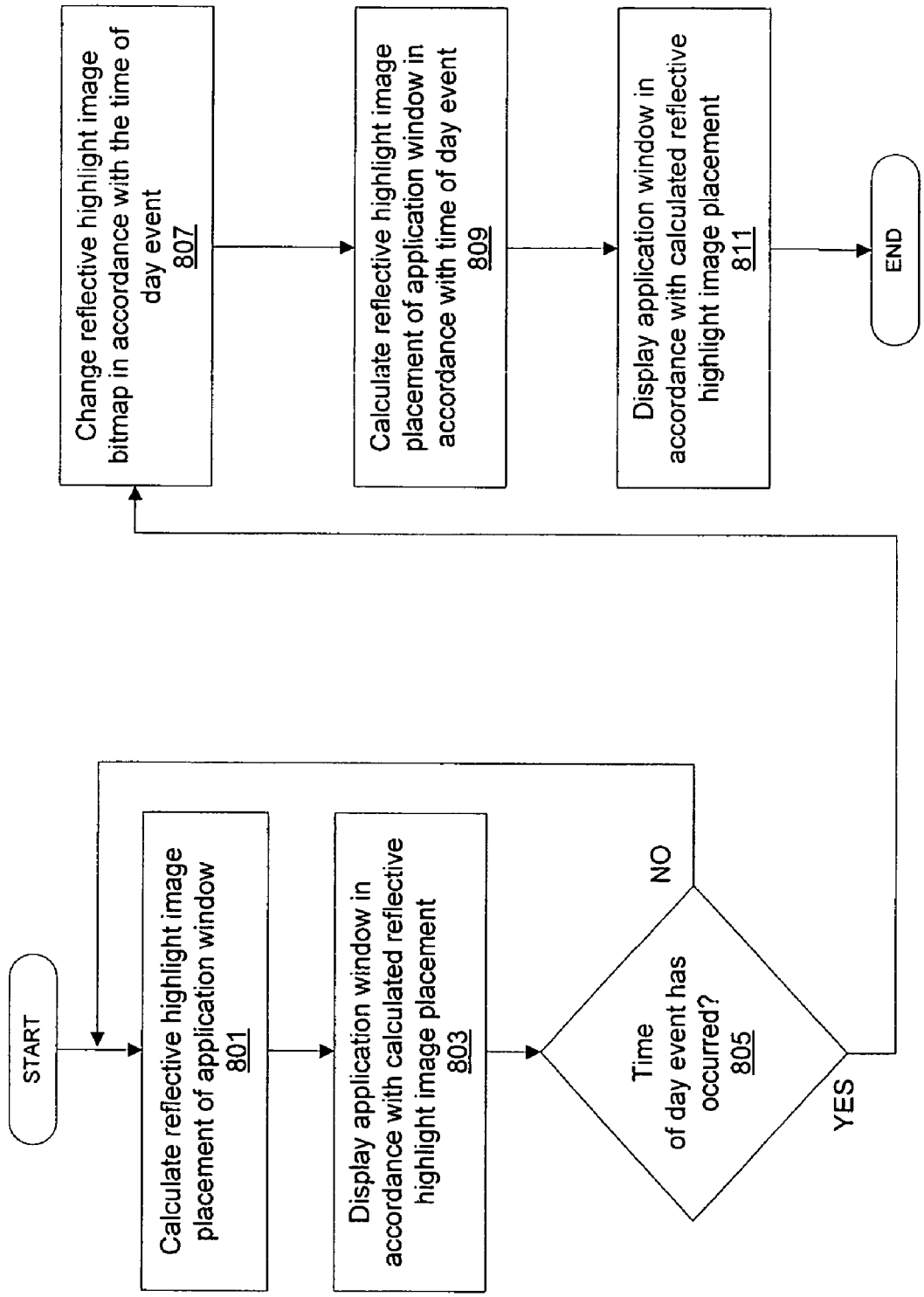
FIG. 8 is a flowchart of an illustrative example of a method for displaying an application window with a glass appearance window frame over time in accordance with at least one aspect of the present invention.

FIG. 8 is a flowchart of an illustrative example of a method for displaying an application window with a glass appearance window frame over time in accordance with at least one aspect of the present invention. The method starts at step 801 where a reflective highlight image placement of an application window is calculated. At step 803, the application window is displayed in accordance with the calculated reflective highlight image placement. For example, application window 203 in FIG. 6A may be the result from step 803.

Proceeding to step 805, a determination is made as to whether a time of day event has occurred. If no, the process returns to step 801 for a refresh of the display screen in which the application window is displayed. If yes to step 805, the method moves to step 807 where the reflective highlight image placement of the application window is changed in accordance with the time of day event. For example, the time of day event may be a change in the time from 8 AM to 10 AM. At step 809, a reflective highlight image placement of the application window is calculated in accordance with the time of day event. Similarly, at step 811, the application window is displayed in accordance with the calculated reflective highlight image placement. In accordance with one or more steps of the method of FIG. 8, the reflective highlight on an application window dynamically changes over time.

Figure 9A:
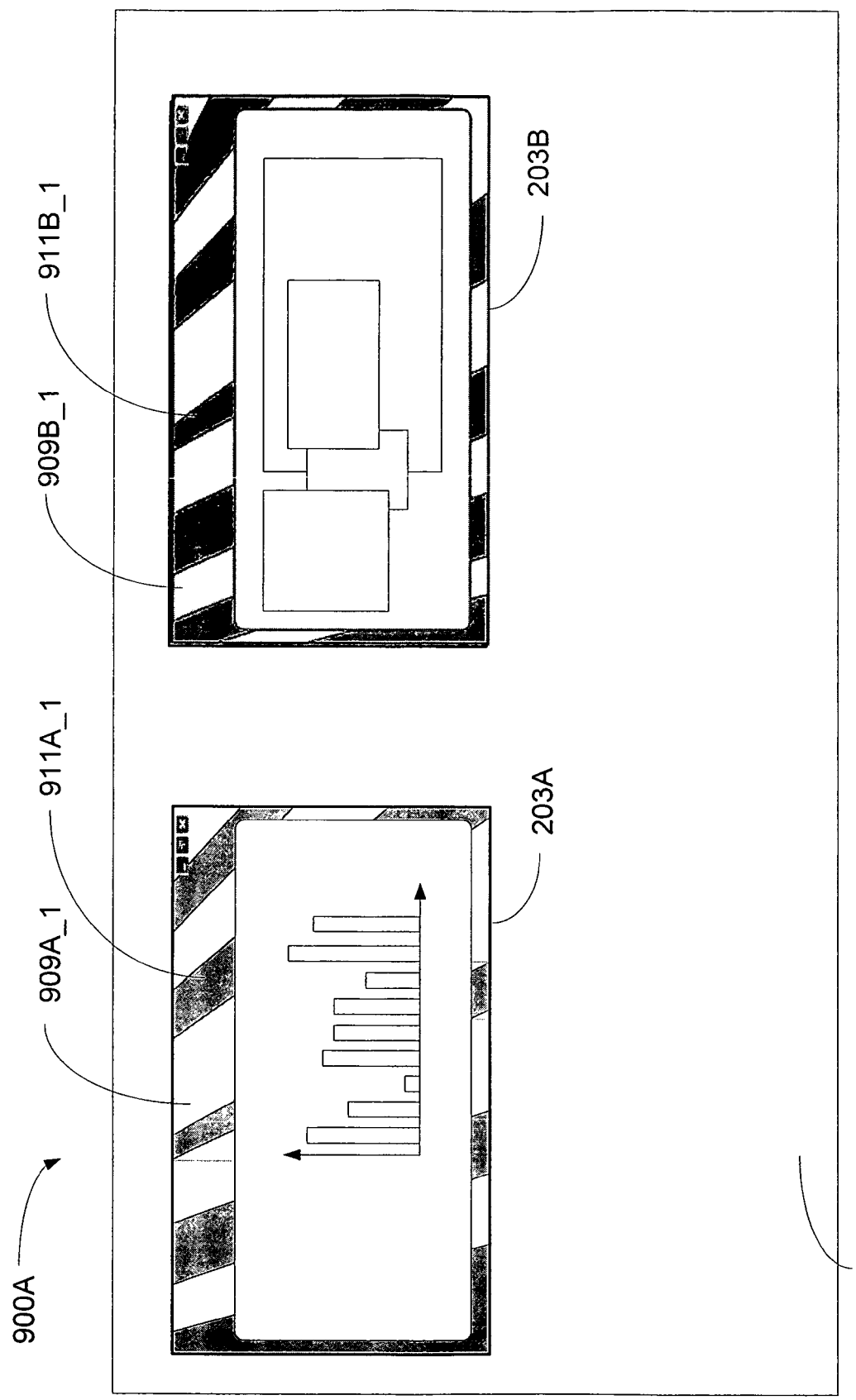
FIGS. 9A-9B illustrate an example of an application window scenario including active and inactive reflective highlights in accordance with at least one aspect of the present invention.
Figure 9B:
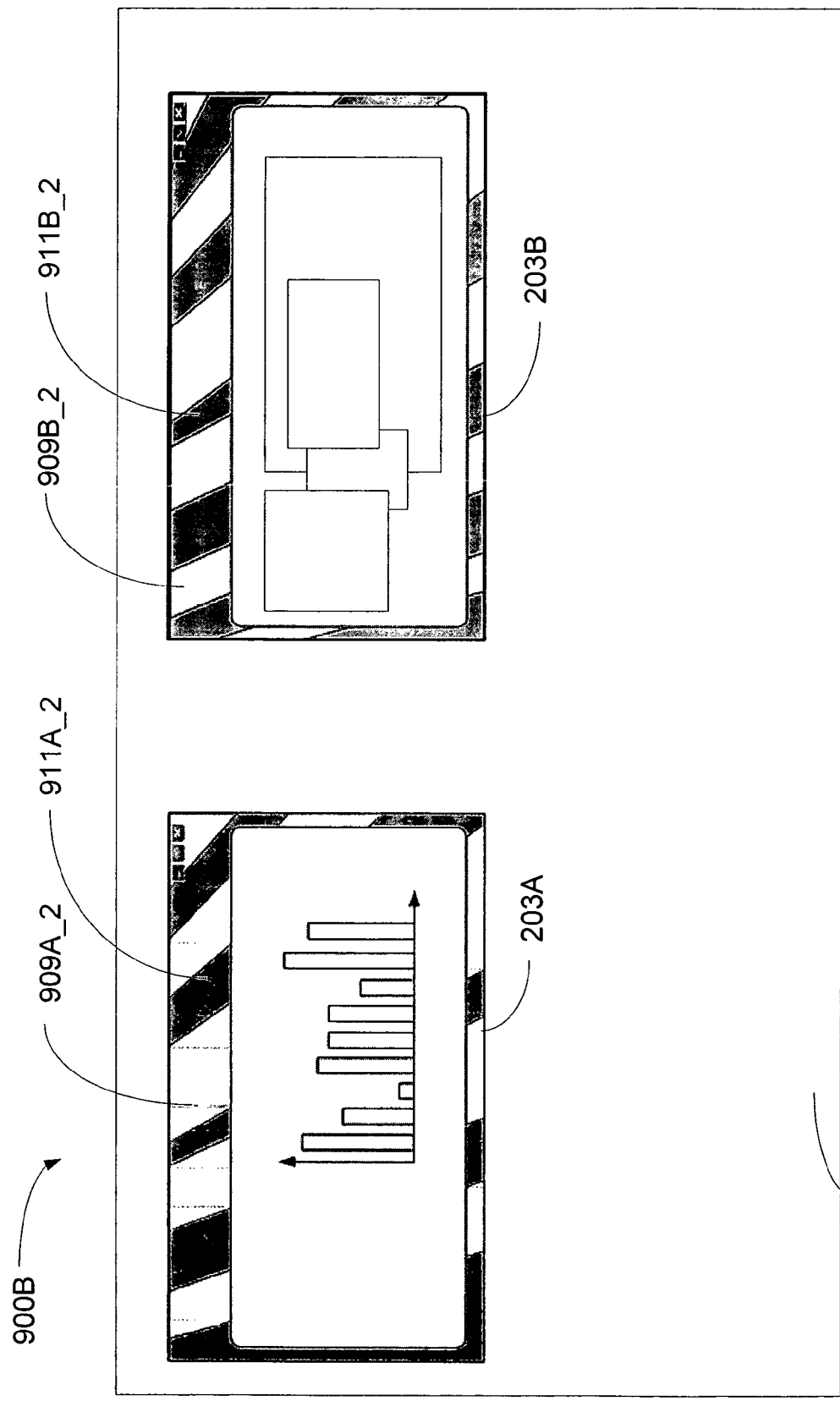

FIGS. 9A-9B illustrate an example of an application window scenario including active and inactive reflective highlights in accordance with at least one aspect of the present invention. FIG. 9A illustrates an example 900A of when application window 203A is in an active visual state and application window 203B is in an inactive visual state. The difference in the visual states may be that the reflective highlight on the glass appearance window frame of application window 203A is more opaque than that on the glass appearance window frame of application window 203B. It should be understood that an active application window is one that is currently in use by a user while an inactive application window must be accessed in some manner in order to become active. The application program associated with application window 203A may be a different application program or the same application program corresponding to application window 203B. Each of application windows 203A-203B is independent of and external to the other window 203A-203B. As used herein, a first application window is external to a second application window when the first application window is not contained within the second application window and the second application window is not contained within the first application window. It should be understood that a first window is not contained in a second application window if the two application windows merely overlap.

Example 900A in FIG. 9A illustrates an active state reflective highlight pattern of reflective highlight portions 909A_1 and non-reflective highlight portions 911A_1 of a first application window 203A and an inactive state reflective highlight pattern of reflective highlight portions 909B_1 and non-reflective highlight portions 911B_1 of a second application window 203B. In this example, the reflective highlight portions 911A_1 may be more opaque than the reflective highlight portions 909B_1. In accordance with one or more aspects of the present invention, the degree of difference in opacity may be such that a user can visually delineate the difference between the different reflective highlight portions of the two application windows. For example, the opacity designation may be on a scale of 10% to 90% opacity where an entry of 10% corresponds to a mostly transparent reflective highlight portion while an opacity of 90% corresponds to a mostly opaque reflective highlight portion.

Upon an occurrence of application window 203B becoming the active window, application window 203A automatically becomes inactive. Example 900B in FIG. 9B illustrates an end transition from FIG. 9A with an inactive state reflective highlight pattern of reflective highlight portions 909A_2 and non-reflective highlight portions 911A_2 of the first application window 203A and an active state reflective highlight pattern of reflective highlight portions 909B_2 and non-reflective highlight portions 911B_2 of the second application window 203B. In this example, since application window 203B is now the active application window, the reflective highlight portions 911A_2 may be less opaque that the reflective highlight portions 909B_2. Such an occurrence of an event may occur when a user clicks on application window 203B with an input device.

Figure 10:
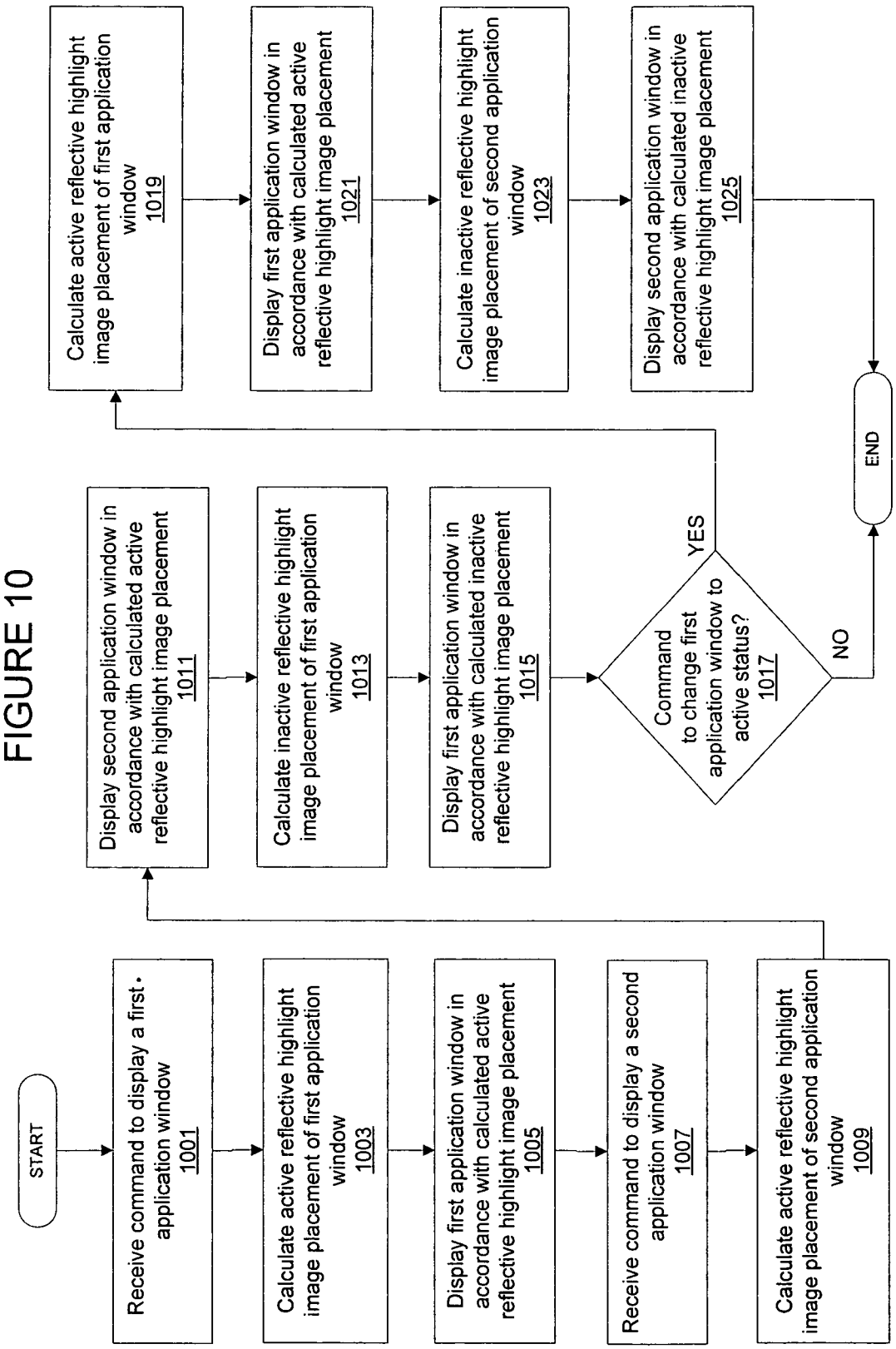
FIG. 10 is a flowchart of an illustrative example of a method for displaying application windows with glass appearance window frames based on whether they are in an active or inactive state in accordance with at least one aspect of the present invention.

FIG. 10 is a flowchart of an illustrative example of a method for displaying application windows with glass appearance window frames based on whether they are in an active or inactive state in accordance with at least one aspect of the present invention. The process starts at a step 1001 where a command is received to display a first application window. At step 1003, an active state reflective highlight image placement of the first application window is calculated. Moving to step 1005, the first application window is displayed in accordance with the calculated active state reflective highlight image placement for the glass appearance window frame of the application window. At step 1007, a command is received to display a second application window. Similarly to steps 1003 and 1005 for the first application window, at step 1009 an active state reflective highlight image placement of the second application window is calculated, and at step 1011 the second application window is displayed in accordance with the calculated active state reflective highlight image placement for the glass appearance window frame of the application window.

Proceeding to step 1013, an inactive state reflective highlight image placement of the first application window is calculated, and, at step 1015, the first application window is displayed in accordance with the calculated inactive state reflective highlight image placement for the glass appearance window frame of the application window. At step 1017, a determination is made as to whether a command has been received to change the first application window to an active state status. If not, the process ends. If a command has been received in step 1017, the process moves to step 1019.

At step 1019, an active state reflective highlight image placement of the first application window is calculated. Moving to step 1021, the first application window is displayed in accordance with the calculated active state reflective highlight image placement for the glass appearance window frame of the application window. At step 1023, an inactive state reflective highlight image placement of the second application window is calculated, and the second application window is displayed in accordance with the calculated inactive state reflective highlight image placement for the glass appearance window frame of the application window at step 1025 before ending. Although not shown within these Figures, it should be understood by those skilled in the art that more than two application windows may be configured within a desktop space and that the present invention is not so limited to one or two application windows.

FIG. 11 is a flowchart of an illustrative example of a method for changing a default reflective highlight of a window frame of an application window in accordance with at least one aspect of the present invention. As described herein, one or more aspects of the dynamic reflective highlight system may be configured by a computer system and/or by a user. A default configuration may be established and/or may exist for different operating system environment themes. A user may then be permitted to change one or more aspects of the default configuration.

Starting at step 1101, a default reflective highlight image placement of an application window is calculated. At step 1103, the application window is displayed in accordance with the calculated default reflective highlight image placement. At step 1105, a determination is made as to whether a command has been received to change the default configuration of the reflective highlight image placement. If not, the process ends. If the determination to step 1105 is yes, the process moves to step 1107 where a user-defined reflective highlight image placement of the application window is received. For example, a user may decide to change the reference point for a light source creating the reflective highlight. Proceeding to step 1109, the user-defined reflective highlight image placement of the application window is calculated. Finally, at step 1111, the application window is displayed in accordance with the calculated user-defined reflective highlight image placement and the process ends.

It should be understood by those skilled in the art that although the Figures illustrate examples of reflective highlights that dynamically change in a horizontal manner, the present invention includes application to changes in a vertically manner as well. In addition, other variables such as stacked windows, obscured windows, and/or overlapping windows may also be taken into account when rendering a reflective highlight on a glass appearance window frame of an application window. Those skilled in the art would appreciate these variables and all the possible configurations that may exist.

With respect to an application programming interface (API), various aspects of the present invention may be performed by an API. For example, public APIs may interface with an operating system to allow the operating system to provide the various features of the present invention. In one embodiment, a software architecture stored on one or more computer-readable media for processing data representative of a change in the reflective highlight on a glass appearance window frame of an application window may include a component configured to change a reflective highlight on a glass appearance window frame of an application window and an application program interface to access the component. An API may receive a request to change the reflective highlight on a glass appearance window frame of an application window, access the necessary function(s) to perform the operation, and then send the results back to an operating system. The operating system may use the data provided from the API to perform the various features of the present invention.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A computer storage medium having computer-executable commands for performing a method for changing a reflective highlight on a glass appearance window frame, the steps comprising:
   displaying the glass appearance window frame around an application window, wherein the glass appearance window frame comprises an application window frame having one or more display characteristics that convey the appearance of real-world, physical glass;
   displaying a first reflective highlight on the glass appearance window frame, wherein the first reflective highlight conveys the appearance of a real-world reflection of light from a light source;
   calculating a second reflective highlight in response to detection of an event; and
   changing the displayed first reflective highlight on the glass appearance window frame of the first application window to the second reflective highlight.

2. The computer storage medium of claim 1, wherein the event conesponds to receipt of a command to reposition the application window.

3. The computer storage medium of claim 2, wherein the command to reposition corresponds to a command to move the application window from a first position in a desktop space to a second position in the desktop space.

4. The computer storage medium of claim 3, wherein for each refresh of a display screen, the computer-executable commands further perform steps of:
 calculating a different reflective highlight; and
 displaying the different reflective highlight on the glass appearance window frame of the application window at a different position in the desktop space.

5. The computer storage medium of claim 2, wherein the command to reposition includes a command to reposition the application window to a position within a stack of application windows in a desktop space.

6. The computer storage medium of claim 1, wherein the event coffesponds to receipt of a command to change the active/inactive status of the application window.

7. The computer storage medium of claim 1, wherein the event coffesponds to a time of day event.

8. The computer storage medium of claim 1, wherein the event corresponds to receipt of a command to change a reflective highlight configuration of glass appearance window frames of application windows.

9. The computer storage medium of claim 8, wherein the command to change coffesponds to a change in a reference point of a reflective highlight originating light source.

10. The computer storage medium of claim 8, wherein the command to change corresponds to receipt of a user input to change the reflective highlight configuration to a second reflective highlight configuration.

11. The computer storage medium of claim 1, further comprising steps of:
 displaying a third reflective highlight on a glass appearance window frame of a second application window;
 calculating a fourth reflective highlight; and
 changing the displayed third reflective highlight on the glass appearance window frame of the second application window to the fourth reflective highlight.

12. The computer storage medium of claim 11, wherein the second reflective highlight is more opaque than the fourth reflective highlight.

13. The computer storage medium of claim 1, wherein the step of calculating includes steps of:
 determining an area of a glass appearance window frame of the application window within a desktop space; and
 determining a portion of a reflective highlight image bitmap for display in response to the detection of the event.

14. The computer storage medium of claim 13, wherein the step of determining the portion of the reflective highlight image bitmap includes determining an offset of the application window from a center of the desktop space.

15. A method for changing a reflective highlight on a glass appearance window frame, the method comprising steps of:
 displaying the glass appearance window frame around an application window, wherein the glass appearance window frame comprises an application window frame having one or more display characteristics that convey the appearance of real-world, physical glass;
 displaying a first reflective highlight on the glass appearance window frame, wherein the first reflective highlight conveys the appearance of a real-world reflection of light from a light source;
 calculating a second reflective highlight in response to detection of an event, wherein the event corresponds to at least one of receipt of a command to reposition the application window, receipt of a command to change the active/inactive status of the application window, and a time of day event, wherein a time of day event comprises a change of time of day; and
 changing the displayed first reflective highlight on the glass appearance window frame of the first application window to the second reflective highlight.

16. The method of claim 15, wherein the command to reposition corresponds to a command to move the application window from a first position in a desktop space to a second position in the desktop space.

17. The method of claim 15, wherein for each refresh of a display screen, the method further comprising steps of:
 calculating a different reflective highlight; and
 displaying the different reflective highlight on the glass appearance window frame of the application window at a different position in the desktop space.

18. The method of claim 15, further comprising steps of:
 displaying a third reflective highlight on a glass appearance window frame of a second application window;
 calculating a fourth reflective highlight; and
 changing the displayed third reflective highlight on the glass appearance window frame of the second application window to the fourth reflective highlight,
 wherein the second reflective highlight is different from the fourth reflective highlight.

19. A software architecture stored on one or more computer storage media for processing data representative of a change in a reflective highlight on a glass appearance window frame of an application window, comprising:
 at least one component configured to automatically change a reflective highlight on a glass appearance window frame of an application window in response to detection of an event, wherein the glass appearance window frame comprises an application window frame having one or more display characteristics that convey the appearance of real-world, physical glass, and wherein the event corresponds to at least one of receipt of a command to reposition the application window, receipt of a command to change the active/inactive status of the application window, and a change of time of day; and
 at least one application program interface to access the component.

* * * * *

UNITED STATES PATENT AND TRADEMARK OFFICE
CERTIFICATE OF CORRECTION

| | | |
|---|---|---|
| PATENT NO. | : 7,412,663 B2 | Page 1 of 1 |
| APPLICATION NO. | : 11/289510 | |
| DATED | : August 12, 2008 | |
| INVENTOR(S) | : Donald J. Lindsay et al. | |

It is certified that error appears in the above-identified patent and that said Letters Patent is hereby corrected as shown below:

In column 17, line 2, in Claim 2, delete "conesponds" and insert -- corresponds --, therefor.

In column 17, line 20, in Claim 6, delete "coffesponds" and insert -- corresponds --, therefor.

In column 17, line 23, in Claim 7, delete "coffesponds" and insert -- corresponds --, therefor.

In column 17, line 29, in Claim 9, delete "coffesponds" and insert -- corresponds --, therefor.

Signed and Sealed this
Third Day of May, 2011

David J. Kappos
*Director of the United States Patent and Trademark Office*